(12) United States Patent
Mutai et al.

(10) Patent No.: US 6,824,028 B2
(45) Date of Patent: Nov. 30, 2004

(54) HOLDER ASSEMBLY FOR HAND-HELD DEVICE

(75) Inventors: Yutaka Mutai, Itabashi-ku (JP); Hiroshi Ebihara, Itabashi-ku (JP)

(73) Assignee: Tajima Tool Corporation (JP)

( * ) Notice: Subject to any disclaimer, the term of this patent is extended or adjusted under 35 U.S.C. 154(b) by 93 days.

(21) Appl. No.: 10/265,641

(22) Filed: Oct. 8, 2002

(65) Prior Publication Data

US 2003/0074803 A1 Apr. 24, 2003

(30) Foreign Application Priority Data

Oct. 24, 2001 (JP) .................................. 2001-325788

(51) Int. Cl.[7] .............................................. A45F 5/00
(52) U.S. Cl. .................... 224/271; 224/269; 224/904; 33/768
(58) Field of Search ............................... 224/660, 663, 224/666, 669, 670, 678, 269, 271, 272, 904, 930, 674; 33/768

(56) References Cited

U.S. PATENT DOCUMENTS

| | | | |
|---|---|---|---|
| 4,083,481 A | | 4/1978 | Selinko |
| 4,598,027 A | * | 7/1986 | Johnson .................... 428/542.8 |
| 5,025,966 A | * | 6/1991 | Potter .......................... 224/183 |
| 5,213,240 A | | 5/1993 | Dietz et al. |
| 5,347,693 A | | 9/1994 | Otrusina |
| 5,730,342 A | * | 3/1998 | Tien ........................... 224/271 |
| 5,791,019 A | | 8/1998 | Jeong |
| 5,829,102 A | | 11/1998 | Conti |
| 6,283,348 B1 | * | 9/2001 | Wang ......................... 224/271 |
| 6,286,737 B1 | * | 9/2001 | Whitley ...................... 224/271 |
| 2003/0000976 A1 | * | 1/2003 | Malhotra .................... 224/197 |

FOREIGN PATENT DOCUMENTS

| | | |
|---|---|---|
| JP | 5-45502 | 6/1993 |
| JP | 09-272076 | 10/1997 |
| JP | 2756783 | 5/1998 |

\* cited by examiner

Primary Examiner—Stephen K. Cronin
(74) Attorney, Agent, or Firm—Parkhurst & Wendel, L.L.P.

(57) ABSTRACT

A holder assembly for a hand-held device, such as a tape measure, includes a main body for holding the hand-held device, and a bracket that can be fixedly secured to the hand-held device. The bracket is accommodated in the groove of the main body when it is slidingly engaged into the groove from the side of a tapered end region. The main body includes a slider that is engageable with an opposite end region of the bracket when the bracket is accommodated in the groove, for preventing withdrawal of the bracket out of the groove of the main body. The slider is manually disengageable from the bracket for allowing the bracket to be removed out of the groove of the main body.

16 Claims, 7 Drawing Sheets

HOLDER ASSEMBLY FOR HAND-HELD DEVICE

BACKGROUND OF THE INVENTION

1. Field of the Invention

The present invention relates to a holder assembly for a hand-held device, such as a tape measure.

2. Description of the Related Art

In order that a hand-held device can be readily carried and instantly used whenever necessary in a construction site or the like, hand-held devices are often provided with a resilient grip that can be resiliently engaged with, and disengaged from a belt worn by an operator. Since such a grip generally exerts a substantially constant gripping force, there is a problem in the case of a thick belt that the grip cannot be readily engaged with, or disengaged from the belt. Alternatively, in the case of a thin belt, the hand-held device tends to be readily dislocated along the belt or bodily removed therefrom, as the working posture of the operator changes significantly. Needless to say, removal of the hand-held device from the belt may be hazardous particularly when the operator is working at a high construction site.

For overcoming these problems, JP 5-45502U discloses a carrying case for a tape measure, wherein the case has a slit-like opening for passing therethrough a belt that is worn by an operator. The tape measure is accommodated within the case so that the grip is engaged with a flap that is provided for the case. Since the tape measure is retained with the case solely by the resilient force of the grip, the tape measure may be inadvertently removed from the case when a severe force is applied to the tape measure.

As another solution, JP 2756783B2 discloses a safety holder that includes a main body and an insertion piece fixedly secured to a hand-held device and adapted to be detachably inserted into the main body. Here also, the main body has a slit-like opening for passing therethrough a belt that is worn by an operator. The insertion piece is provided with a pair of resilient lugs that are opposed to each other so as to be engageable with corresponding recesses in the main body. In this instance, for removing the hand-held device retained by the main body, it is necessary to deflect the lugs out of the recesses, respectively, and simultaneously move the insertion piece out of the main body while holding the hand-held device. Thus, the hand-held device cannot be removed without complicated manual operations, beside that the resilient lugs tend to be readily broken when the hand-held device is inadvertently dropped.

SUMMARY OF THE INVENTION

It is therefore an object of the present invention to provide an improved holder assembly for a hand-held device, which can be readily operated in a simple manner, and which positively retains the hand-held device when it is not in use.

According to the present invention, there is provided a holder assembly for a hand-held device, comprising: a main body for holding the hand-held device, and a bracket that can be fixedly secured to the hand-held device. The main body is formed with a groove having a closed end and an open end. The bracket has a first end region with a tapered shape and a second end region opposite to the first end region, and is accommodated in the groove of the main body when the bracket is slidingly engaged into the groove from the side of the first end. The main body comprises a retainer means engageable with the second end region of the bracket when it is accommodated in the groove, for preventing withdrawal of the bracket out of the groove of the main body. The retainer means is disengageable from the second end region of the bracket for allowing the bracket to be removed out of the groove in the main body.

It is preferred that the retainer means comprises a slider movably supported by the main body, and a resilient member for normally urging the slider to a first position where the slider is engaged with the second end region of the bracket when it is accommodated in the groove, wherein the slider is manually movable to a second position against the force of the resilient member so as to be disengaged from the second end region of the bracket.

In this connection, the slider may have a top edge formed with regular ridges for preventing slipping when the top edge is engaged by thumb of an operator.

The main body may have a guide surface for the slider, which is inclined with reference to a direction in which the bracket is engaged into, and disengaged from the groove. The slider may have a top edge formed with regular ridges for preventing slipping when the top edge is engaged by thumb of an operator.

It is preferred that the closed end of the groove and the first end region of the bracket are provided with first and second positioning means, respectively, which are engageable with each other.

It is preferred that one of the main body and the bracket has a resilient lug including a free end provided with a projection, and the other of the main body and the bracket has a recess that can be engaged with, and disengaged from the projection, wherein the resilient lug is resiliently deflectable in a direction perpendicular to a direction in which the bracket is engaged into, and disengaged from the groove.

It is preferred that the main body and/or the bracket are comprised of plastic material.

The main body may have a slit-like opening for passing therethrough a belt that is worn by an operator.

BRIEF DESCRIPTION OF THE DRAWINGS

The present invention will now be described in further detail hereinafter, with reference to a preferred embodiment shown the accompanying drawings.

DETAILED DESCRIPTION OF THE PREFERRED EMBODIMENT

Figure 1:
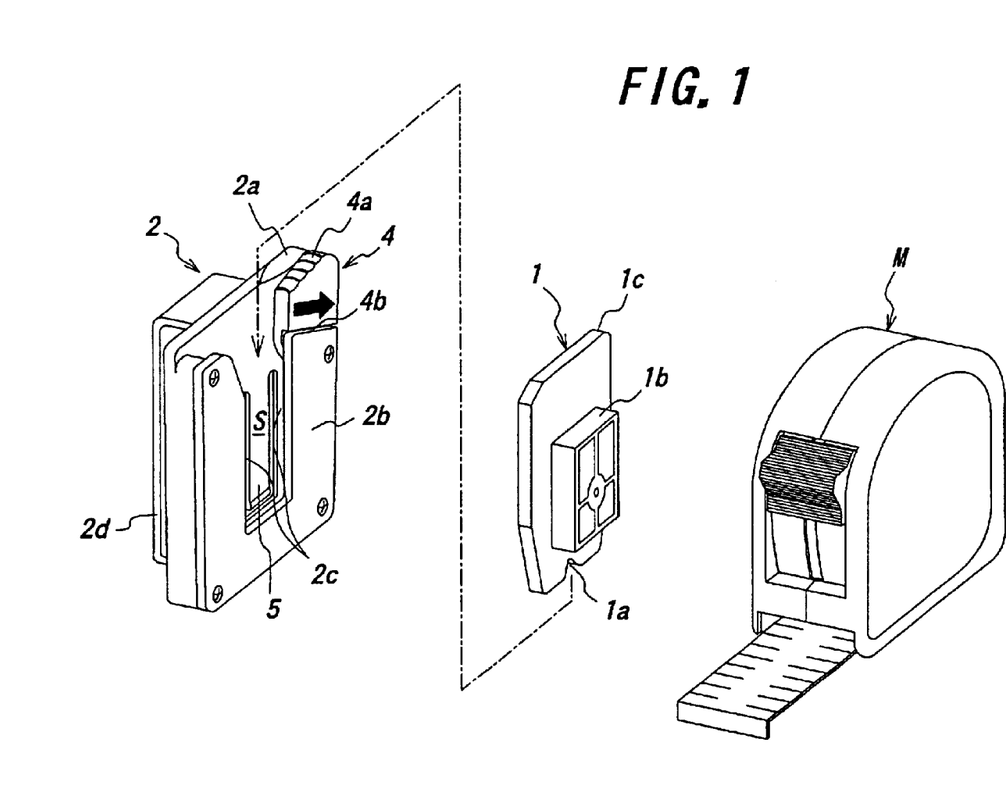
FIG. 1 is an exploded view of a holder assembly according to one embodiment of the present invention.

Referring now to FIG. 1, there is shown a holder assembly according to one embodiment of the present invention, which includes a bracket 1 that can be fixedly secured by an appropriate fastener (not shown) to a hand-held device in the form of a tape measure M, and a main body 2 for detachably holding the bracket 1. The bracket 1 has a lower end region with a tapered shape, and is provided with a recess 1a in its bottom edge, and a base portion 1b on its one side. The base portion 1b has a generally square contour, and can be brought into contact with the rear surface of the housing of the tape measure M.

Figure 2:
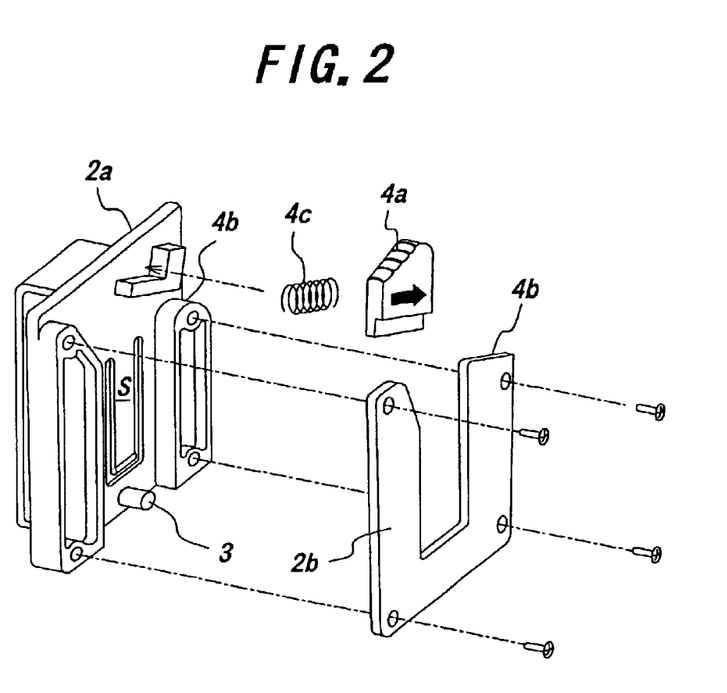
FIG. 2 is an exploded view of the main body shown in FIG. 1.

As particularly shown in FIGS. 1 and 2, the main body 2 includes a base plate 2a and a sub-plate 2b detachably connected to the base plate 2a by means of a plurality of fasteners. The base plate 2a has a substantially square contour while the sub-plate 2b has a substantially U-shaped contour. The base plate 2a and the sub-plate 2b are arranged opposite to each other to define a groove 2c into which the bracket 1 can be inserted. The groove 2c thus defines a space S for accommodating the bracket 1 and thereby holding the tape measure M when it is not in use.

As shown in FIG. 2, the base plate 2a is integrally provided with a positioning pin 3 at that position of the space S, which corresponds to the recess 1a of the bracket 1. Thus, when the bracket 1 is fully inserted into the groove 2c, the recess 1a of the bracket 1 is engaged by the pin 3 of the base plate 2a for positioning the bracket 1.

The main body 2 is provided with a retainer means 4 for retaining the bracket 1 when it is accommodated in the space S of the main body 2. The retainer means 4 includes a slider 4a that can be moved along an inclined guide surface 4b against the resilient force of a compression coil spring 4c accommodated in the slider 4a. The guide surface 4b extends obliquely downwards, with an inclination angle $\theta_1$ relative to the width direction of the main body 2. The slider 4a has a top edge formed with regular ridges for preventing slipping when the top edge is engaged by thumb of the operator. The slider 4a normally assumes a position where it is engaged with the top edge 1c of the bracket 1 for preventing withdrawal of the bracket 1 out of the groove 2c in the main body 2 and thereby retaining the tape measure M when it is not in use. When the slider 4a is manually moved laterally, i.e., in the width direction indicated by a bold arrow in FIG. 1, against the resilient force of the compression coil spring 4c, the slider 4a is disengaged from the top edge 1c of the bracket 1 to thereby allow withdrawal of the bracket 1 out of the groove 2c.

Figure 3:
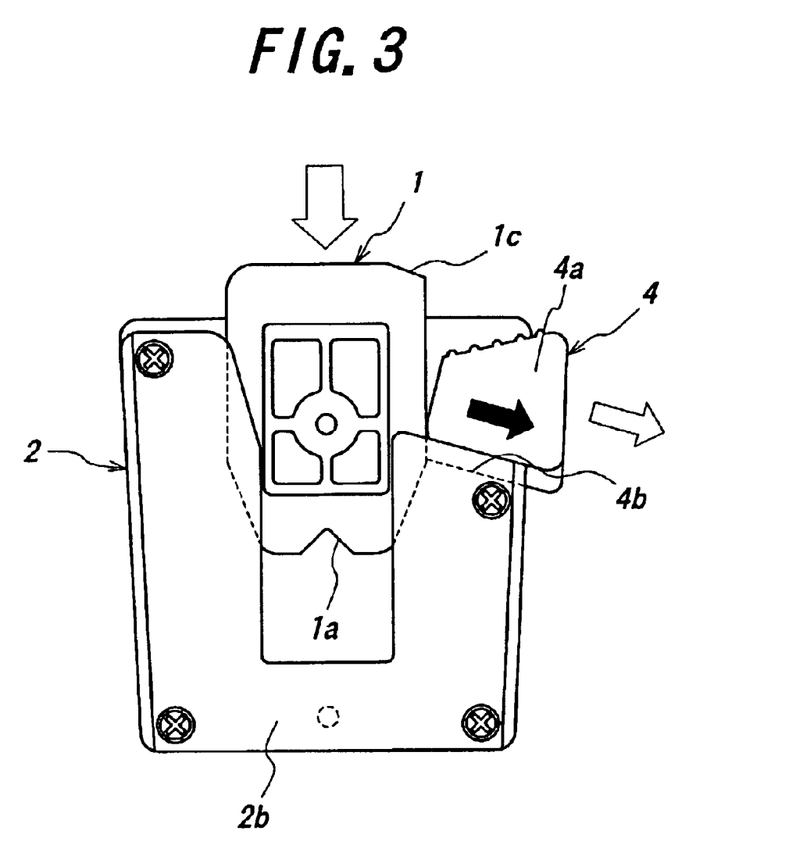
FIG. 3 is a front view of the bracket shown in FIG. 1 as it is being inserted into the groove in the main body.
Figure 4:
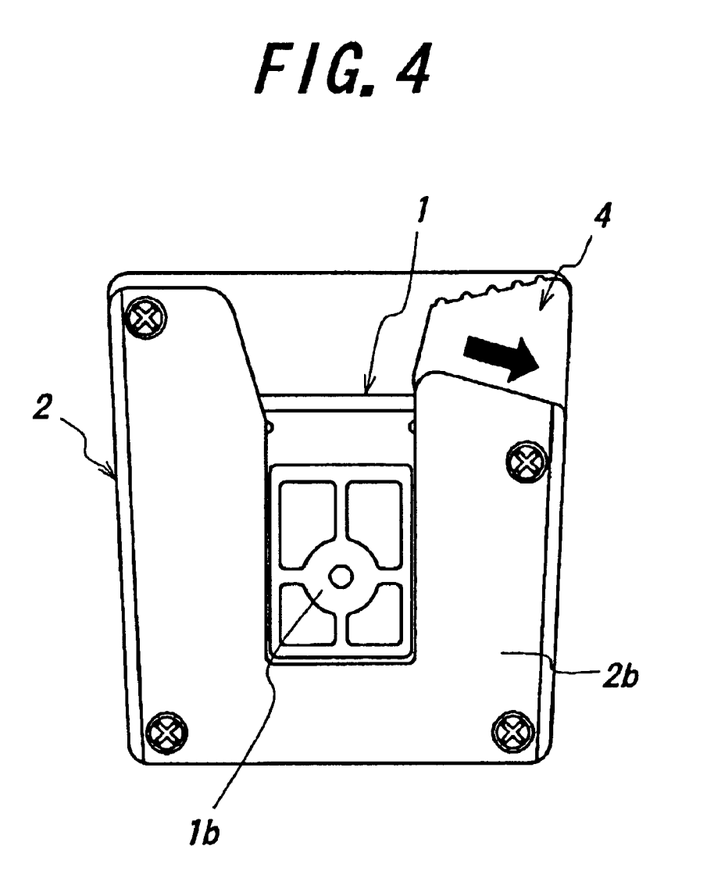
FIG. 4 is a front view similar to FIG. 3, with the bracket fully inserted into the groove in the main body.

As shown in FIG. 3, when the bracket 1 is inserted into the groove 2c in the main body 2, the tapered lower end region of the bracket 1 causes the slider 4a to be moved laterally along the guide surface 4b, against the resilient force of the compression coil spring 4c, thereby allowing further insertion of the bracket 1 into the groove 2c. In the fully inserted position of the bracket 1, where the recess 1a in the bottom edge of the bracket 1 is engaged by the pin 3 of the base plate 2a for positioning the bracket 1, the slider 4a is returned to the original position under the resilient force of the compression coil spring 4c and thereby engaged with the top edge 1c of the bracket 1. By this, as shown in FIGS. 4 and 5, the bracket 1 is positively retained in the space S defined by the groove 2c and prevented from being withdrawn from the main body 2 even when it is pulled upwards.

Figure 5:
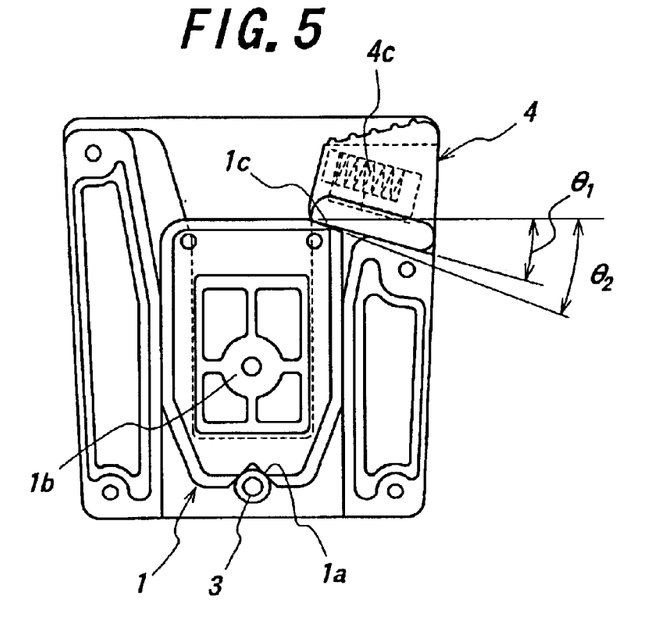
FIG. 5 is a front view corresponding to FIG. 4, with a sub-plate removed.

As further shown in FIG. 5, the top edge 1c of the bracket 1 has a corner region that is inclined with an angle $\theta_2$, which is slightly larger than the inclination angle $\theta_1$ of the guide surface 4b. Such an arrangement makes it possible to provide an increased downward force generated by the compression coil spring 4c and transmitted from the slider 4a to the compression coil spring 4c, for more positively retain the bracket 1 within the space S defined by the groove 2c.

Figure 6:
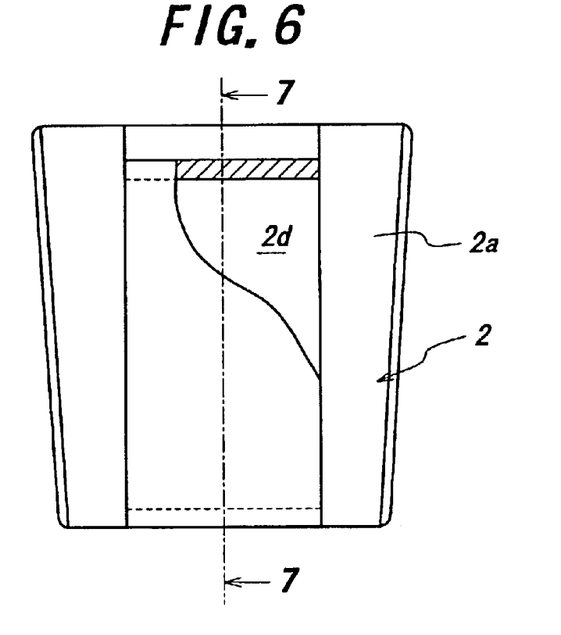
FIG. 6 is a rear view of the main body.
Figure 7:
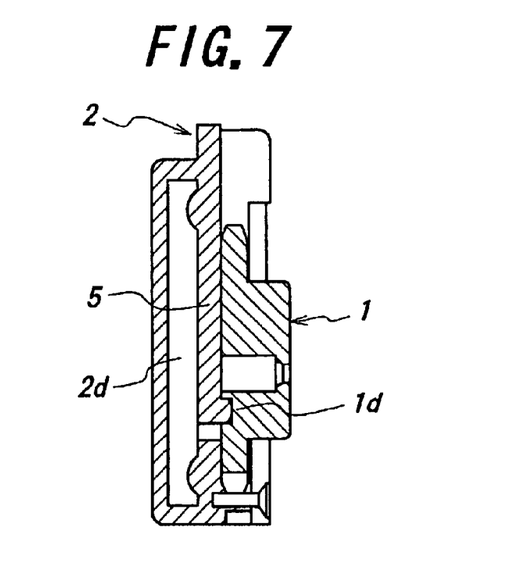
FIG. 7 is a sectional view taken along the line 7—7 in FIG. 6.

It is noted that the rear surface of the main body 2 is formed with a slit-like opening 2d as shown in FIGS. 6 and 7, for passing a belt (not shown) that is worn by an operator. Thus, it is possible to achieve a positive connection between the belt and the main body 2.

Figure 9:
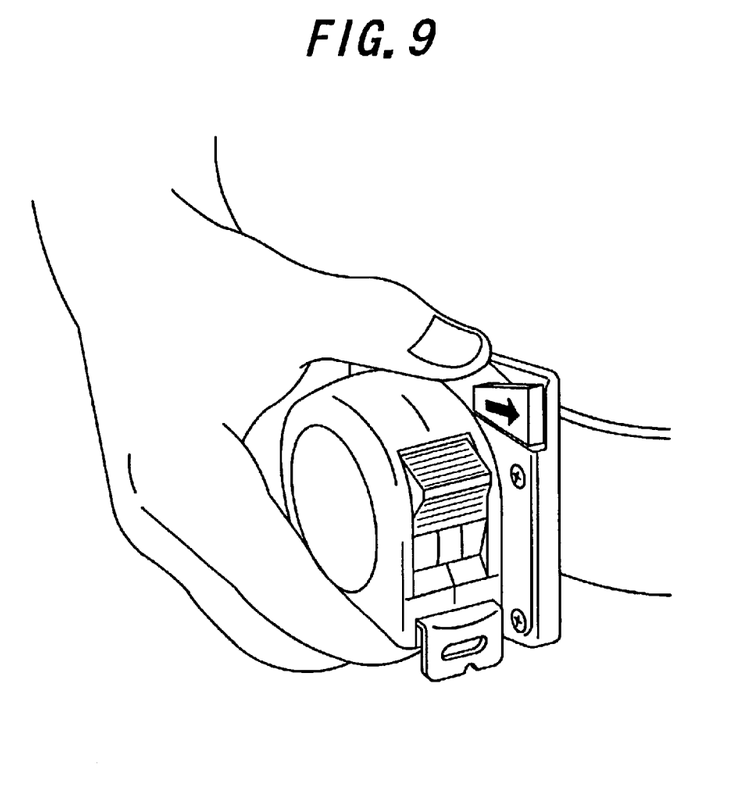
FIG. 9 is a perspective view showing the holder assembly in use.

In order to remove the tape measure M from the holder assembly, all what is necessary is to grasp the tape measure M by palm and press the slider 4a downwards by thumb, as shown in FIG. 9. On this occasion, the slider 4a as guided by the inclined guide surface 4b is moved laterally and disengaged from the top edge 1c of the bracket 1, thereby allowing withdrawal of the bracket 1 out of the groove 2c together with the tape measure M as a reaction of the downward pressure applied to the slider 4a. In this way, the tape measure M can be removed from the holder assembly with a very simple and natural manual operation.

Figure 8:
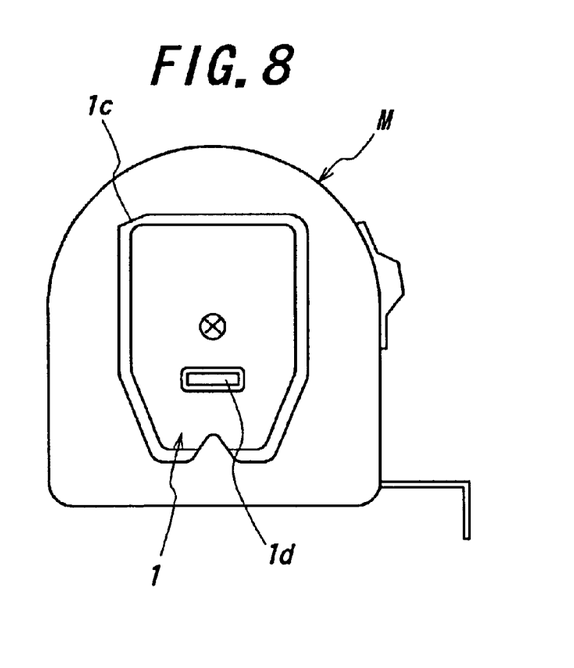
FIG. 8 is a front view of the bracket fixedly secured to a tape measure.

It is noted that the base plate 2a of the main body 2 is provided with a resilient lug 5, as shown in FIG. 1, while the front surface of the bracket 1 is formed with a recess 1d for receiving a projected end of the resilient lug 5, as shown in FIG. 8. Thus, when the bracket 1 is fully inserted into the groove 2c and accommodated in the space S within the main body 2, the projected end of the resilient lug 5 is brought into engagement with the recess 1d in the bracket 1 and cooperate. In this instance, in addition to the engagement of the recess 1a in the bracket 1 with the positioning pin 3 of the base plate 2a, it is possible positively to prevent shaking motion of the bracket 1 in its width direction.

Incidentally, all the elements of the holder assembly, except some of the fasteners, may be made of an appropriate engineering plastic material.

It will be appreciated that the present invention provides an improved holder assembly for a hand-held device, such as a tape measure, which can be readily operated in a simple manner, and which positively retains the hand-held device when it is not in use.

While the present invention has been described above with reference to a preferred embedment, it has been presented by way of example only, and various modifications may be made without departing from the scope of the invention as defined by the appended claims.

Thus, for example, the base plate 2a and the sub-plate 2b of the main body 2 may be formed as an integral element. Also, the hand-held device may be a tool, such as a cutter, or other portable device such as a cellular phone.

What is claimed is:

1. A holder assembly for a hand-held device, comprising:
   a main body for holding a hand-held device, said main body having therein a generally U-shaped groove defining an axis that is generally centrally located between the U-legs of the U-shaped groove and having a closed end and an open end into which an object may be inserted; and
   a bracket for being fixedly secured to a hand-held device, said bracket having a trapezoidal first end region comprising edges which converge toward each other and a second end region opposite to the first end region, said bracket fitting in the groove in the main body when the first end of the bracket is slidingly inserted into the groove;
   said main body comprising a retainer means engageable with said second end region of the bracket when it is in said groove, for preventing withdrawal of the bracket from the groove in the main body, said retainer means being disengageable from said second end region of the bracket for permitting said bracket to be removed from said groove of said main body;

said retainer means comprising a slider movably supported by the main body, and a resilient member for urging the slider to a first position where the slider is engaged with said second end region of the bracket when the bracket is in said groove, said slider being movable to a second position, against the force of said resilient member, for being disengaged from said second end region of the bracket;

said main body having a guide surface for said slider, said guide surface being inclined relative to said axis.

2. The holder assembly according to claim 1, wherein said slider has a top edge comprising regular ridges for preventing slipping when the top edge is engaged by a thumb of an operator.

3. The holder assembly according to claim 1, wherein said closed end of the groove comprises a positioning means engageable with said first end region of the bracket.

4. The holder assembly according to claim 1, wherein said first end region of the bracket comprises a positioning means engageable with said closed end of the groove.

5. The holder assembly according to claim 1, wherein said closed end of the groove comprises a first positioning means and said first end region of the bracket comprises second positioning means, said first and second positioning means being engageable with each other.

6. The holder assembly according to claim 1, wherein one of said main body and said bracket comprises a resilient lug including a free end having a projection, and the other of said main body and said bracket comprises a recess in which said projection can be engaged and disengaged, said resilient lug being resiliently deflectable in a direction perpendicular to said receiving direction.

7. The holder assembly according to claim 1, wherein at least one of said main body and said bracket comprise plastic material.

8. The holder assembly according to claim 1, wherein said main body has a slit-like opening for passing a belt therethrough.

9. The holder assembly according to claim 1, comprising in combination therewith a taps measure.

10. A holder assembly for a tape measure, comprising:

a main body for holding a tape measure, said main body having therein a generally U-shaped groove defining an axis that is generally centrally located between the U-legs of the U-shaped groove and having a closed end and an open end into which an object may be inserted, and a slit-like opening for passing therethrough a belt worn by an operator; and a bracket for being fixedly secured to a tape measure, said bracket having a trapezoidal first end region comprising edges which converge toward each other and a second end region opposite to the first end region, said bracket fitting in the groove in the main body when the first end of the bracket is slidingly inserted into the groove;

said main body comprising a retainer means engageable with said second end region of the bracket when it is in said groove, for preventing withdrawal of the bracket from the groove in the main body, said retainer means being disengageable from said second end region of the bracket for permitting said bracket to be removed from said groove of said main body;

said retainer means comprising a slider movably supported by the main body, and a resilient member for urging the slider to a first position where the slider is engaged with said second end region of the bracket when the bracket is in said groove, said slider being movable to a second position, against the force of said resilient member, for being disengaged from said second end region of the bracket;

said main body having a guide surface for said slider, said guide surface being inclined relative to said axis.

11. The holder assembly according to claim 10, wherein said slider has a top edge comprising regular ridges for preventing slipping when the top edge is engaged by a thumb of an operator.

12. The holder assembly according to claim 10, wherein said closed end of the groove comprises a positioning means engageable with said first end region of the bracket.

13. The holder assembly according to claim 10, wherein said first end region of the bracket comprises a positioning means engageable with said closed end of the groove.

14. The holder assembly according to claim 10, wherein said closed end of the groove comprises a first positioning means and said first end region of the bracket comprises a second positioning means, said first and second positioning means being engageable with each other.

15. The holder assembly according to claim 10, wherein one of said main body and said bracket comprises a resilient lug including a free end having a projection, and the other of said main body and said bracket comprises a recess in which said projection can be engaged and disengaged, said resilient lug being resiliently deflectable in a direction perpendicular to said axis.

16. The holder assembly according to claim 10, wherein at least one of said main body and said bracket comprise plastic material.

* * * * *